Sept. 2, 1924.

F. E. FIELD 1,506,896

TESTING METHOD AND SYSTEM

Filed July 31, 1923

Inventor
Frank E. Field
by Joel C. R. Palmer, Atty.

Patented Sept. 2, 1924.

1,506,896

UNITED STATES PATENT OFFICE.

FRANK E. FIELD, OF SOMERVILLE, NEW JERSEY, ASSIGNOR TO WESTERN ELECTRIC COMPANY, INCORPORATED, OF NEW YORK, N. Y., A CORPORATION OF NEW YORK.

TESTING METHOD AND SYSTEM.

Application filed July 31, 1923. Serial No. 654,822.

*To all whom it may concern:*

Be it known that I, FRANK E. FIELD, a citizen of the United States, residing at Somerville, in the county of Somerset, State of New Jersey, have invented certain new and useful Improvements in Testing Methods and Systems, of which the following is a full, clear, concise, and exact description.

This invention relates to testing methods and systems.

An object of this invention is to provide means and methods for measuring the voltage ratio or amplification of transformers, particularly vacuum tube input transformers.

The voltage amplification of a vacuum tube input transformer may be measured in accordance with this invention by connecting the secondary winding of the transformer under test to the input circuit of a vacuum tube amplifier, working under impedance conditions comparable to the impedance conditions met in actual service, while the primary winding is connected to a resistance or network having an impedance value equal to the impedance from which it is desired to have the transformer work. An alternating current of a definite frequency is impressed upon the primary winding of the transformer under test and the IR drop in a resistance in shunt to the primary winding circuit is measured for a given indication in an ammeter or other measuring instrument coupled to the output circuit of the vacuum tube amplifier. The transformer is then effectively removed from the circuit and the IR drop across the terminals of the resistance directly in shunt to the input electrodes of the tube is measured when the reading in the instrument coupled to the output circuit of the tube is the same as that obtained with the transformer included. The ratio of the two measured potential differences therefore gives the voltage amplification of the transformer for the particular frequency employed. If the voltage amplification is desired for other frequencies, similar readings may be taken for the whole frequency range over which it is desired to employ the transformer.

Figure 1:
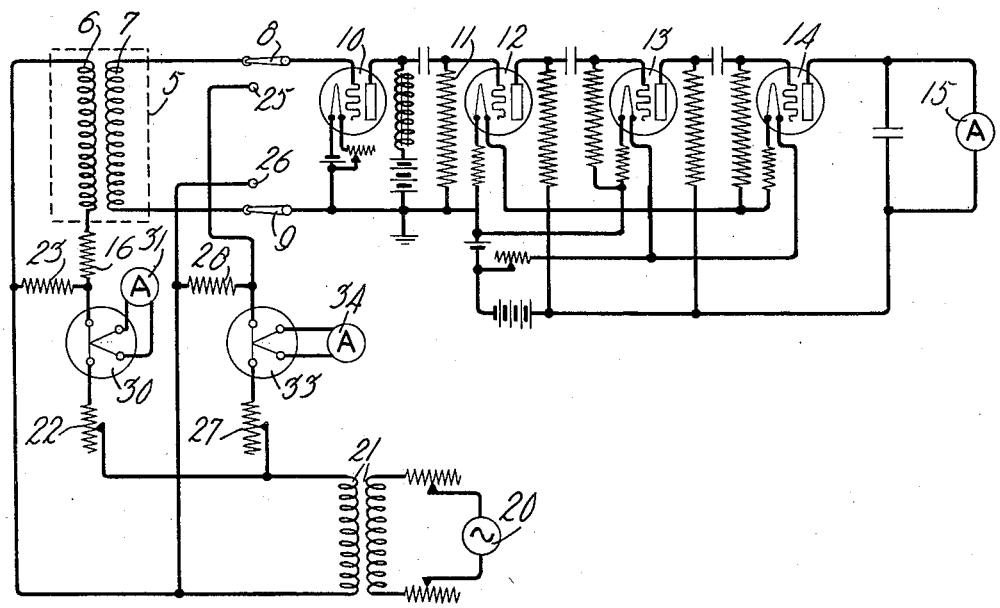
Figure 2:
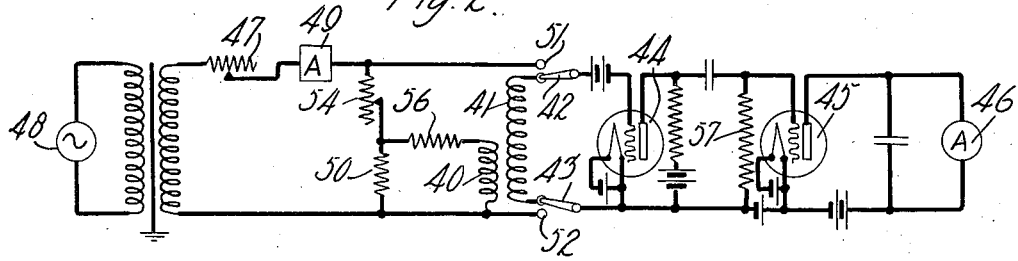

Referring to the drawing, Fig. 1 represents this invention embodied in a system for measuring the voltage amplification of vacuum tube input transformers; and Fig. 2 is a simplified modification of Fig. 1 capable of giving voltage amplification measurements of almost the same accuracy as that obtained by the more elaborate system of Fig. 1.

Referring more in particular to Fig. 1, the system disclosed is arranged to measure the voltage amplification of a vacuum tube input transformer 5 having a primary winding 6 and a secondary winding 7. The secondary winding 7 of the transformer is connected through switching means 8 and 9 to the input terminals of a vacuum tube amplifier 10 of the type with which it is desired to employ transformer 5 in actual service conditions, care being taken to adjust the space current and the filament heating current and to have tube 10 otherwise adjusted to its normal working conditions. The high resistance 11 upon which is impressed the amplified current from amplifier 10 should have an impedance equal to the output impedance into which tube 10 will normally be worked. The alternating current potential developed across the terminals of resistance 11 may be amplified by suitable amplifiers 12 and 13 and rectified by a three-electrode rectifier 14 to give an amplified reading in the direct current measuring instrument 15 proportional to the output obtained from the tube 10 under the conditions about to be described.

The primary winding 6 of the transformer under test is connected in series with a resistance 16 or other network having an impedance equal to that from which the transformer is designed to operate. Alternating current voltage from a suitable source 20 is impressed through a transformer 21 upon the primary winding of transformer 5, the value of which may be varied by an adjustment of a series adjustable resistance 22. The value of the alternating current voltage impressed upon the primary circuit of the transformer under test may be ascertained by determining the potential difference across the terminals of the resistance 23, which preferably has a resistance very small compared to the resistance of the element 16. When the voltage impressed upon the primary winding of the transformer under test is of the desired magnitude, the reading on the direct current measuring instrument 15 is noted, and if necessary the amplification obtained by amplifiers 12 and 13 may be adjusted to give an indication of considerable magnitude.

The transformer 5 is then removed from the circuit by connecting the switch arms 8 and 9 to points 25 and 26, whereby the alternating current from source 20 is impressed directly upon the tube 10 through a series adjustable resistance 27 and a small shunt resistance 28. The series resistance 27 is adjusted until the indication in the direct current measuring instrument 15 is of the same magnitude as that obtained previously with transformer 5 connected in circuit. The potential difference across the terminals of the small shunt resistance 28 is then measured and the ratio between the potential drop across the terminals of resistance 28 and the potential drop obtained across the terminals of resistance 23 obtained in the manner described will be a measure of the voltage amplification of the transformer 5 for the particular frequency delivered by the source 20. The voltage amplification of the transformer 5 for other frequencies may be taken in a similar manner by connecting to the primary winding of transformer 21 suitable means for delivering the frequency desired.

One way in which the potential drop across the terminals of resistance 23 may be measured is by means of a series thermocouple 30, the terminals of the thermocouple being connected to a suitable ammeter 31. Although the thermocouple 30 is shown connected in series with the resistances 16 and 22, the reading obtained thereby will be substantially the same as if the thermocouple were included directly in the shunt circuit comprising the resistance 23, providing resistance 23 is of a value small compared to resistance 16. In general, it will be preferable to have resistance 23 of the order of one percent or even one tenth of one percent of the value of the resistance 16 in order to prevent the presence of resistance 23 from materially altering the impedance 16, which is intended to have a value corresponding to the impedance from which it is desired to operate the transformer under test. Due to this impedance relation between the optimum values of resistances 16 and 23, it will generally be objectionable to include a high resistance thermocouple in the shunting circuit comprising the resistance 23.

The current through the resistance 28 may be measured in a similar manner by means of a serially connected thermocouple 33, to the terminals of which is connected a suitable ammeter 34. Due to the fact that the input impedance of tube 10 is very high, and resistance 16 will also in general be of a considerable magnitude, the error introduced by the measurement of the current in the shunting resistances by the serially connected thermocouple will be less than the error in reading the meters attached to the thermocouple and to the amplifier-rectifier circuit.

Another possible arrangement for measuring the voltage amplification of a transformer comprising a primary winding 40 and a secondary winding 41 is shown in Fig. 2. The secondary winding 41, as in Fig. 1, is connected through switch arms 42 and 43 to the input circuit of the vacuum tube amplifier 44, working under impedance conditions similar to actual service conditions. The output from the tube 44 may be amplified and rectified by a tube 45 before being impressed upon a direct current measuring instrument 46. With the transformer 40, 41 connected in circuit, the serially connected resistance 47 may be adjusted to impress upon the primary circuit of the transformer alternating current voltage of a suitable magnitude from the current source 48. The reading in the ammeter 49 is then noted and the voltage impressed upon the primary circuit of the transformer is equal to the current, as indicated by the ammeter, multiplied by the value of the shunt resistance 50. The switch arms 42, 43 are then transferred to contacts 51 and 52, whereby the transformer is effectively removed from the circuit and the input terminals of tube 44 are connected across both resistance 50 and the adjustable shunt resistance 54. The adjustable resistance 54 is then varied in value until the reading obtained by the ammeter 46 is the same as that obtained with the transformer 40, 41 connected in circuit. The voltage which it is necessary to impress upon tube 44 to obtain the same indication in the ammeter 46 is equal to the sum of resistances 50 and 54 multiplied by the reading obtained in ammeter 49 with the transformer disconnected. The ratio between the potential drop across the terminals of resistances 54 and 50 and the potential drop across the resistance 50 alone, obtained in the above manner, will be a measure of the voltage amplification of the transformer 40, 41.

A serially connected resistance 56 connected in series with the primary winding 40 should, as in Fig. 1, be given a value equal to the impedance from which it is desired to have the transformer operate. In a similar manner, the resistance 57 into which tube 44 operates should be equal to the impedance into which the tube works under normal operating conditions.

It is to be understood that this invention may possess various forms differing widely from those described above without departing in any wise from the spirit of this invention as defined in the appended claims.

The invention claimed is:

1. The method of determining the voltage ratio of a transformer which comprises connecting the primary winding of the transformer in circuit with an impedance of substantially the same value as the impedance from which it will operate under service conditions, connecting the secondary winding to a load equal to the load under normal service conditions, measuring a given potential applied to the primary winding circuit with the load connected to the secondary winding, measuring the potential which must be applied to the load, with the transformer disconnected, to obtain in the load the same current as when said given potential was applied to the primary winding circuit, and comparing the two measured potentials.

2. The method of determining the voltage amplification of a transformer which comprises connecting the primary winding of the transformer in circuit with an impedance of substantially the same value as the impedance from which the transformer will operate under normal service conditions, connecting the secondary winding to a load circuit having an impedance substantially equal to the load impedance into which the transformer will work under normal service conditions, measuring the potential difference across the terminals of a resistance connected across the primary winding circuit, measuring the potential difference across the terminals of a resistance connected across the load circuit with said transformer disconnected, and comparing the two measured potential differences when the output current in said load circuit is the same under both conditions.

3. The method of determining the voltage amplification of a vacuum tube input transformer which comprises connecting the primary winding of the transformer to an impedance approximately equal to the impedance from which the transformer is designed to operate, connecting the secondary winding to the input terminals of a vacuum tube amplifier of the type with which the transformer is designed to be operated, measuring the output from said tube for a given potential applied across the terminals of the primary winding circuit, disconnecting the transformer, and measuring the electromotive force which must be impressed directly upon the input terminals to give an equal output from said tube.

4. Apparatus for measuring the voltage amplification of a transformer comprising means connected to the primary circuit of said transformer for simulating the impedance from which the transformer is designed to operate, means arranged to be connected to the secondary winding of said transformer for simulating the impedance into which the transformer is designed to operate, a circuit of small resistance connected across the terminals of the primary winding circuit, a second circuit of small resistance arranged to be connected across the terminals of said second means, means for impressing an alternating current potential upon said resistance circuits, switching means for connecting said second means at times to said secondary winding and other times to said second resistance circuit with the transformer disconnected, and means for measuring the respective potential differences across the terminals of said resistance circuits when the voltage impressed upon said second means is the same for both positions of said switching means.

5. Apparatus for measuring the voltage amplification of a transformer comprising means connected to the primary winding circuit for simulating the impedance from which the transformer is designed to operate, means arranged to be connected to the secondary winding of said transformer for simulating the impedance into which the transformer is designed to operate, a source of alternating current, switching means for connecting said second means to said source at times through said transformer and at other times with said transformer disconnected, and means for measuring the voltage impressed upon said primary winding circuit for one position of said switching means and for measuring the voltage impressed directly upon said second means for equal output current from said second means.

6. Apparatus for measuring the voltage amplification of a transformer comprising impedance means connected in the primary winding circuit for simulating the impedance from which the transformer is designed to operate, means comprising a vacuum tube amplifier connected to the secondary winding for simulating the impedance into which the transformer is designed to operate, a source of alternating current, switching means for connecting said source to the input terminals of said tube through said transformer and at other times for connecting said source directly to said input terminals with said transformer removed from circuit, means for measuring the output current of said tube, and means for impressing a sufficient portion of the voltage of said source upon said tube for both positions of said switching means to give equal alternating current output from said tube.

7. Apparatus for measuring the voltage amplification of a transformer comprising an impedance serially connected with the primary winding circuit for simulating the impedance from which the transformer is designed to operate, means comprising a vacuum tube amplifier connected to the secondary winding of said transformer for simulating the impedance into which said transformer is designed to operate, a resistance connected across the primary winding circuit, said resistance being of small value compared to the impedance of said serially connected impedance, a source of alternating current connected to said primary winding circuit, leads arranged to connect the input terminals of said tube directly to said source without the intermediary of said transformer, a resistance of small value connected across said leads, and means for measuring the potential impressed across the terminals of said resistance for equal output alternating current from said tube.

8. Apparatus for measuring the voltage amplication of a vacuum tube input transformer comprising a source of alternating current, a vacuum tube of the type into which said transformer is designed to operate, connections between said source and the input terminals of said tube including said transformer, connections between said source and the input terminals of said tube excluding said transformer, switching means for connecting said input terminals at times to one set of said connections and other times to the other set of said connections, means connected to said primary winding for simulating the impedance from which said transformer is designed to operate, a small resistance connected across each set of said connections, means for adjusting the potential difference applied to said resistances from said source, means for measuring the current in each of said resistances, and means for measuring the output alternating current of said tube.

In witness whereof, I hereunto subscribe my name this 26 day of July A. D., 1923.

FRANK E. FIELD.